United States Patent [19]

Tsai

[11] Patent Number: 5,315,372
[45] Date of Patent: May 24, 1994

[54] NON-CONTACT SERVO TRACK WRITING APPARATUS HAVING READ/HEAD ARM AND REFERENCE ARM

[75] Inventor: John C. Tsai, Saratoga, Calif.

[73] Assignee: Excel Precision, Inc., Santa Clara, Calif.

[21] Appl. No.: 262

[22] Filed: Jan. 4, 1993

[51] Int. Cl.⁵ .............................................. G01B 9/02
[52] U.S. Cl. ..................... 356/358; 356/373; 356/72; 360/78.11
[58] Field of Search ............... 356/358, 363, 373, 375, 356/1, 72, 237; 360/78.11

[56] References Cited

U.S. PATENT DOCUMENTS

| | | | |
|---|---|---|---|
| 3,800,317 | 3/1974 | Lin | 360/78 |
| 4,679,105 | 7/1987 | Maryatt | 360/78.11 |
| 4,784,490 | 11/1988 | Wayne | 356/358 |
| 4,920,442 | 4/1990 | Dimmick | 360/137 |
| 5,074,661 | 12/1991 | Reynolds et al. | 356/237 |
| 5,107,107 | 4/1992 | Osborne | 250/231.14 |
| 5,108,184 | 4/1992 | Brown et al. | 356/363 |

Primary Examiner—Samuel A. Turner
Assistant Examiner—Russell C. Wolfe
Attorney, Agent, or Firm—Michael J. Hughes

[57] ABSTRACT

A servo track writing apparatus (10, 210) for writing servo tracks (16) on a media disk (14) of a disk drive assembly (12), the servo track writing apparatus (10, 210) having a laser interferometer (30) for positioning a remote servo track positioning arm (48, 248) with a second cube corner retroreflector (46) attached thereto. A relationship determining apparatus (56, 256) determines the physical relationship between the track positioning arm (48, 248) and a head positioning arm (22) or linear head actuator (220) using a light emitting device (58) and a photosensitive diode array (60). A third light beam (62) from the light emitting device (58) is reflected from the head positioning arm (22) or linear head actuator (220) onto the photosensitive diode array (60) and variations in the position of the third light beam (62) on the photosensitive diode array (60) cause a head positioning arm servo motor (68) to move the head positioning arm (22) or linear head actuator (220) head positioning arm (22) or linear head actuator (220) as required.

19 Claims, 2 Drawing Sheets

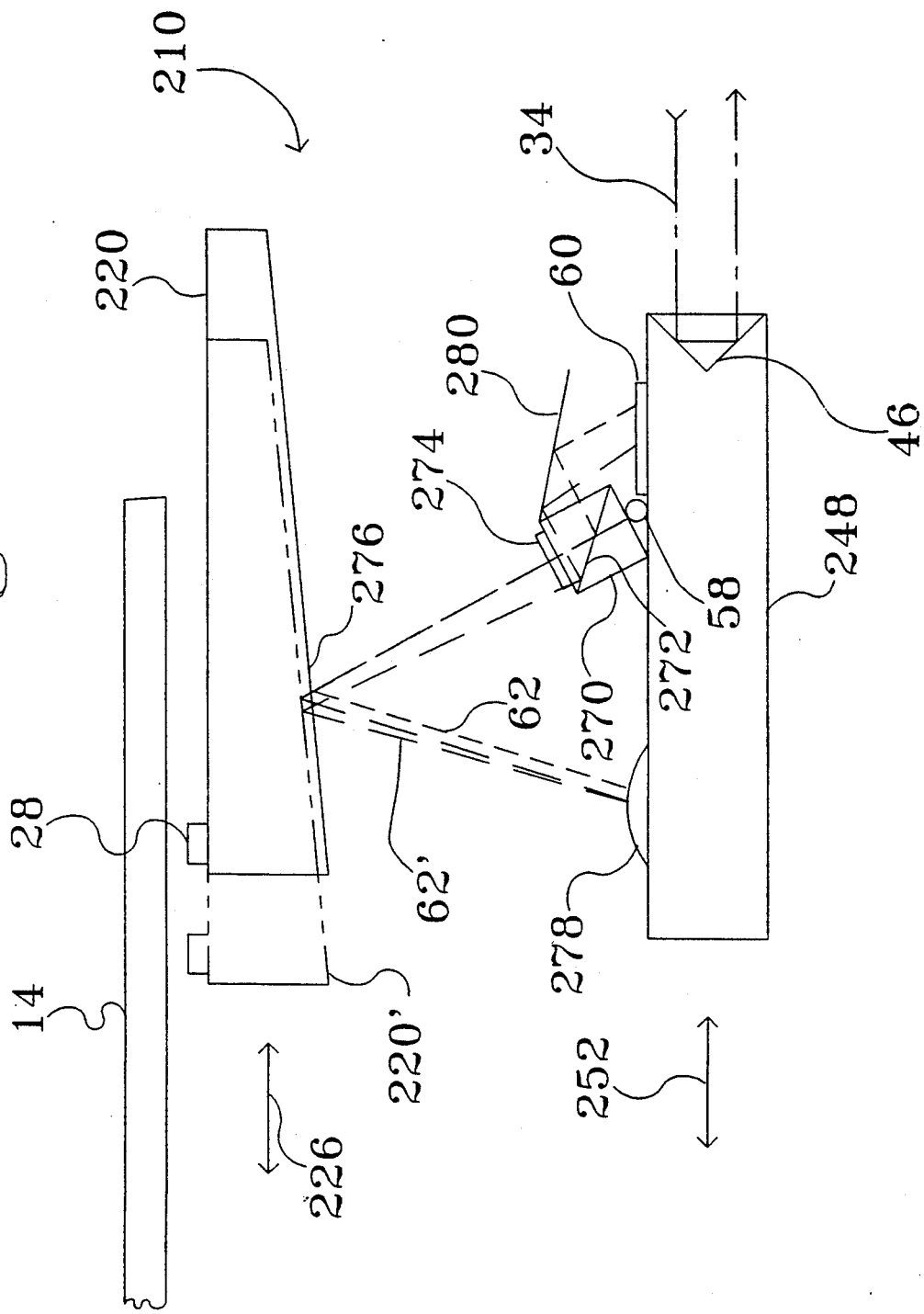

NON-CONTACT SERVO TRACK WRITING APPARATUS HAVING READ/HEAD ARM AND REFERENCE ARM

TECHNICAL FIELD

The present invention relates generally to the field of laser interferometry and more particularly to an improved device and method for accurately positioning a mechanical arm using a laser interferometer. The predominant current usage of the non-contact servo track writing apparatus is in the positioning of servo track writing heads in the manufacture of very small magnetic media hard disk computer mass storage devices.

BACKGROUND ART

When manufacturing magnetic hard disk computer storage devices it is necessary to magnetically "write" servo tracks on the disks, which servo tracks constitute the references from which other positions on the disks are located. Given the very high track density of modern hard disk media, it is critical that these servo tracks be accurately located and, therefore, it is necessary to position the servo track writing apparatus over the disk as precisely as possible during this process. Laser interferometry has been widely used in this endeavor due to the high resolution, high repeatability, great accuracy and fast signal updating rate of this technology. A typical prior art configuration has included a retroreflector mounted on the head positioning arm of the disk drive with the beam of the laser interferometer directed into the retroreflector such that movement of the retroreflector may be detected and measured by the interferometer. In this prior art method, the head positioning arm has an aperture into which a pin may be placed for moving the arm to properly locate the head for writing the servo track. This method has worked perfectly well for most existing hard disk media. However, the demand for smaller and smaller hard disk media has now resulted in the desire to produce hard disk media smaller even than two inches in diameter. Currently, there exists media of 1.8 inches and smaller in various stages of production and preproduction planning. With such very small media disks, not only is it increasingly critical that the servo tracks be accurately placed (since the actual physical track density is increased as the size of the media is decreased) the problem is also introduced that an arm for positioning the write head must be so small that it is difficult to attach a retroreflector thereto. Furthermore, the entire hard disk mechanism is so small that it is not possible to introduce any bulky equipment into the area of the servo writing mechanism to position the arm.

It is known in the art to use a laser interferometer to position devices in a non-invasive manner. U.S. Pat. No. 5,108,184, issued to Brown et al., teaches a variation of the method of using a reflective surface of a device to gauge the position of that device with a laser interferometer.

Clearly, it would be desirable to provide a noninvasive means for positioning a servo track writing device using a laser interferometer. However, to the inventor's knowledge, no prior art device has been readily adaptable to control a very small head positioning arm while providing the same degree of accuracy found in the prior art direct reading interferometer having the retroreflector mounted on the head positioning arm. All prior art non-invasive means for determining the position of a head positioning arm have either required a larger reflective surface than is available in this application, or else have sacrificed accuracy by being highly dependent upon the flatness of the reflective surface, or else have not provided sufficient resolution for the writing of servo tracks on very small media. No prior art device, to the inventor's knowledge, has provided both a means to accurately determine the position of a very small head positioning arm and also a means for adjusting such position.

DISCLOSURE OF INVENTION

Accordingly, it is an object of the present invention to provide a means for positioning a servo track writing device which is adaptable for use with very small media disks and disk drive assemblies.

It is another object of the present invention to provide a means for positioning a servo track writing device which can very accurately position the writing heads.

It is still another object of the present invention to provide a means for positioning a servo track writing device which will direct the laser beam along a narrow path to and from the writing device.

It is yet another object of the present invention to provide a servo track writing device which will both accurately determine the location of a head positioning arm and also cause such arm to move to a correct position.

It is still another object of the present invention to provide a servo track writing device which is adaptable for use with various types of head positioning actuators.

It is yet another object of the present invention to provide a servo track writing device which is inexpensive to produce and reliable in operation.

It is still another object of the present invention to provide a servo track writing device which can be attached to a disk drive assembly, used, and detached quickly, so as to facilitate assembly line production of disk drive devices.

Briefly, the preferred embodiment of the present invention is a first movable arm with a retroreflector mounted thereon such that it may be positioned using a laser interferometer in a conventional manner. Unlike conventional devices, however, a servo track writing head is not mounted directly to the movable arm, since the movable arm is necessarily too large to fit into the available space in a small disk drive assembly. Rather, a second, smaller, movable arm has the servo track writing head attached, thereto. The position of the second movable arm relative to the first movable arm is determined by a light beam and detector combination, and the second movable arm is moved to maintain the desired relationship in relation to the first arm by a servo motor. In the best presently known embodiment of the invention, since the writing of a servo track is generally accomplished after the disk drive is assembled, the second movable arm is the head positioning arm which is a part of the disk drive assembly, and the servo track writing head is the read/write that is, also, a part of the disk drive assembly.

The best presently known embodiment of the invention, as described herein, has the first movable arm beside the second movable arm and is adapted primarily for use with a pivotally mounted head positioning arm. An equally preferred alternate embodiment of the invention has the first movable arm under the second movable arm and is adapted primarily for use with a linearly moving head positioning arm.

An advantage of the present invention is that it retains the accuracy of conventional laser interferometer head positioning devices.

A further advantage of the present invention is that it can be used with very small head positioning arms and very small magnetic media disks.

Yet another advantage of the present invention is that it is not necessary to mechanically connect any positioning apparatus to the head positioning arm.

Still another advantage of the present invention is that it is inexpensive to produce.

Yet another advantage of the present invention is that it can be easily adapted for use with different types of disk drives.

Still another advantage of the present invention is that it is readily adaptable to disk drive production environments.

These and other objects and advantages of the present invention will become clear to those skilled in the art in view of the description of the best presently known modes of carrying out the invention and the industrial applicability of the preferred embodiments as described herein and as illustrated in the several figures of the drawing.

BRIEF DESCRIPTION OF THE DRAWING

FIG. 2 is a diagrammatic front elevational view of an alternative embodiment of the inventive servo track writing apparatus.

BEST MODE FOR CARRYING OUT INVENTION

Figure 1:
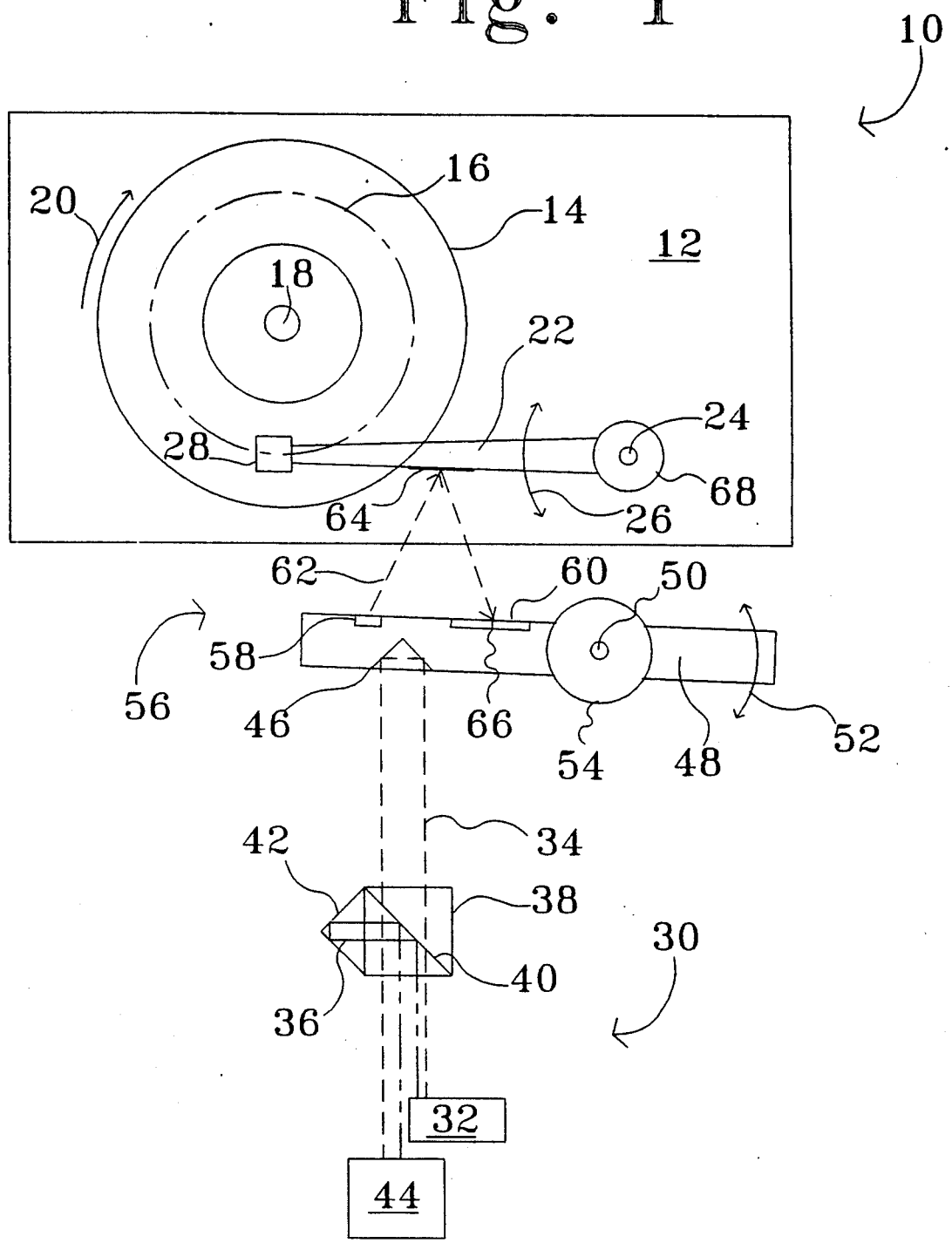
FIG. 1 is a diagrammatic plan view of a servo track writing apparatus according to the present invention.

The best presently known mode for carrying out the invention is a servo track writing apparatus for a rotating magnetic media "hard" disk drive. The predominant expected usage of the inventive servo track writing apparatus is in the computer equipment manufacturing industry, particularly in manufacture of very small hard disk drives wherein the ability to accurately locate a head positioning arm without introducing bulky devices into the disk drive is desirable.

The servo track writing apparatus of the presently preferred embodiment of the present invention is illustrated in a diagrammatic plan view in FIG. 1 and is designated therein by the general reference character 10. The servo track writing apparatus 10 has as a disk drive assembly 12 with a media disk 14 upon which a servo track 16 is to be written. Of course, the servo track 16 is not actually visible in the physical manifestation of the disk drive 12, and it is depicted in the view of FIG. 1 for illustrative purposes only. The media disk 14 is caused to spin about a disk axis 18 as indicated by a disk rotation directional arrow 20. A head positioning arm 22 pivots about a head positioning arm axis 24, as indicated by an arm pivot directional arrow 26, to position a read/write head 28 as required over the rotating media disk 14. The media disk 14, the head positioning arm 22 and the read/write head 28 are all components of the disk drive assembly 12 upon which the operation of writing the servo track 16 is to be performed.

A generally conventional laser interferometer 30 has a laser emitting component 32 for producing a measurement beam 34 and a reference beam 36, with the reference beam 36 being orthogonally polarized in relation to the measurement beam 34. A polarizing cube 38 with a diagonal polarized surface 40 is oriented such that the measurement beam 34 will pass therethrough while the reference beam 36 is reflected into a first cube corner retroreflector 42, from which it is reflected back onto the polarized surface 40 and then into an interferometer receiver/analyzer 44. The measurement beam 34, having passed through the polarized surface 40 is directed into a second cube corner retroreflector 46, from which it is reflected back through the polarized surface 40 and into the interferometer receiver/analyzer 44. One skilled in the art will recognize that interference fringes created by the measurement beam 34 and the reference beam 36 can be used by the interferometer receiver/analyzer 44 to accurately gauge movement of the second cube corner retroreflector 46, and that the position of the second cube corner retroreflector 46 can be accurately determined as a function of such movement.

In the best presently known embodiment 10 of the present invention, the second cube corner retroreflector 46 is affixed to a remote servo track positioning arm 48. The remote servo track positioning arm 48 pivots about a remote arm axis So as indicated by a remote arm pivot directional arrow 52. As can be appreciated, provided that a known fixed relationship is maintained between the remote servo track positioning arm 48 and the head positioning arm 22, the read/write head 28 can be accurately located in relation to the servo track 16 by means of the laser interferometer 30.

According to the present inventive method, the remote servo track positioning arm 48 is driven to the required position, as determined by the laser interferometer 30, by means of a remote motor 54. The position of the head positioning arm 22 relative to the remote servo track positioning arm 48 is determined by a relationship determining apparatus 56 affixed to the remote servo track positioning arm 48. The relationship determining apparatus 56 has a light emitting device 58 and a photosensitive diode array 60. The light emitting device 58 directs a third light beam 62 at a reflective surface 64 of the head positioning arm 22, from which the third light beam 62 is reflected back onto the photosensitive diode array 60. In the best presently known embodiment 10 of the present invention the light emitting device 58 is a light emitting diode laser. The inventor has found that commercially available photosensitive diode arrays 60 will detect any deviation of the third light beam 62 away from a center location 66 of the photosensitive diode array 60 with sufficient sensitivity that a head positioning arm servo motor 68 can be caused to slave the head positioning arm 22 to maintain its relationship to the remote servo track positioning arm 48, such that positioning the remote servo track positioning arm 48 by means of the laser interferometer 30 and the remote motor 54 effectively and accurately causes the read/write head 28 to be positioned for writing the servo track 16. Electronic controls for causing the head positioning arm servo motor 68 to be controlled by input from the photosensitive diode array 60 are conventional in nature and are not shown in the view of FIG. 1.

An equally preferred alternate embodiment 10 of the invention is illustrated in a diagrammatic elevational view in FIG. 2. The equally preferred alternate embodiment 10 is adapted for applications where the remote servo track positioning arm 48 (FIG. 1) cannot readily be positioned alongside the head positioning arm 22 (FIG. 1) and/or where, as in the example of FIG. 2, the read/write head 28 is positioned by a linear head actuator 220. The linear head actuator 220 moves along a linear path as indicated by a linear actuator movement arrow 226. In the equally preferred alternate embodiment 210 of the present invention, an alternative remote servo track positioning arm 248 moves linearly as indicated by an alternative remote servo arm movement arrow 252. The second cube corner retroreflector 46 is mounted in the end of the alternative remote servo track positioning arm 248 such that the measurement beam 34 is directed thereinto for determining the position of the alternate remote servo track positioning arm 248 with the laser interferometer 30 (not shown in the view of FIG. 2).

The linear position of the linear head actuator 220 in relation to the alternate remote servo track positioning arm 248 is determined by an alternate relationship determining apparatus 256. The alternate relationship determining apparatus 256 has the light emitting device 58 and the photosensitive diode array 60 located on the alternate remote servo arm movement arrow 252 as indicated in the view of FIG. 2. In the equally preferred alternate embodiment 10 of the present invention, the third light beam 62 is directed from the light emitting device 58 through a second polarizing cube 270 having a second polarized surface 272, then through a quarter wave plate 274. The third light beam 62 is then reflected from a reflective angled surface 276 of is the linear head actuator 220 onto a convex mirror 278 which is also mounted on the alternate remote servo track positioning arm 248. When the linear head actuator 220 is in its intended relationship to the alternate remote servo track positioning arm 248, the third light beam 62 is reflected back along its original path onto the alternate remote servo track positioning arm 248 and again through the quarter wave plate 274 and onto the second polarized surface 272 of the second polarizing cube 270. One skilled in the art will recognize that, since in the equally preferred alternate embodiment 210 of the present invention the third light beam 62 is a polarized coherent light beam, the effect of passing the third light beam 62 twice through the quarter wave plate 274 as described will cause the third light beam 62 to be rotated in polarity such that it is reflected from the second polarized surface 272, onto a beam bending mirror 280, and then onto the photosensitive diode array 60.

In order to illustrate how the photosensitive diode array 60 detects misalignment of the linear head actuator 220 in relation to the alternate remote servo track positioning arm 248, the linear head actuator 220 is also shown in a misaligned position in phantom outline form in the view of FIG. 2. The misaligned position of the linear head actuator 220 is designated by the reference character 220'. As can be appreciated from the view of FIG. 2, the misaligned linear head actuator 220' causes the third light beam 62' to be reflected along a different path (as compared to the "normal" position of the third light beam 62) onto the convex mirror 278, then back onto the misaligned linear head actuator 220', the second polarized surface 272, the beam bending mirror 280 and finally onto the photosensitive diode array 60. Since the location of the misaligned third light beam 62' as it strikes the photosensitive diode array 60 differs from the that of the aligned third light beam 62, such difference is detected by the photosensitive diode array 60 and can be used to slave the linear head actuator 220 back into alignment with the alternate remote servo track positioning arm 248. It should be noted that motive means for moving the alternate remote servo track positioning arm 248 and the linear head actuator 220 are omitted from the view of FIG. 2 for the sake of clarity.

In like fashion as previously discussed in relation to the example of the best presently known embodiment 10 of the present invention (FIG. 1), in the equally preferred alternate embodiment 210 of the present invention, since the linear head actuator 220 may be maintained in a fixed relationship to the alternate remote servo track positioning arm 248, the read/write head 28 may be accurately positioned in relation to the media disk 14 by movement of the alternate remote servo track positioning arm 248, and the position of the alternate remote servo track positioning arm 248 can be accurately determined by means of the laser interferometer 30 (FIG. 1).

As is shown above, in great part, the servo track writing apparatus 10 and 210 according to the present invention resembles prior art conventional laser interferometer controlled track writing devices in many respects. Among the substantial differences are the inclusion of the remote servo track positioning arm 48 and 248 with the associated relationship determining apparatus 56 and 256, respectively. No significant changes of materials are envisioned nor are any special constructions required.

Various modifications may be made to the invention without altering its value or scope. For example, a multipass interferometer could be used to increase resolution, instead of the single pass laser interferometer 30 illustrated in FIG. 1. Similarly, changes in the geometry or relationship of the components of the invention could be accomplished to adapt the servo track writing apparatus 10 or 210 to specific disk drives 12. Indeed, since it is a primary purpose of the inventive servo track writing apparatus 10 and 210 to work with extremely small disk drives 12 having very crowded conditions therein, it is anticipated that minor changes in the arrangement of components may be necessary in order to adapt the inventive servo track writing apparatus 10 or 210 to each new application.

Yet another example of an obvious modification to the invention would be to rearrange components such that, using as an example the equally preferred alternate embodiment 210 of the invention illustrated in FIG. 2, the third light beam 62 would be reflected first from the linear head actuator 220, then to the alternate remote servo track positioning arm 248, then back to the linear head actuator 220, then again to the alternate remote servo track positioning arm 248, then again back to the linear head actuator 220, and then finally into the photosensitive diode array 60. These additional reflections between the linear head actuator 220 and the alternate remote servo track positioning arm 248 would increase resolution, should that be necessary or desirable in a particular application.

Still another variation of the present invention which the inventor has tried takes advantage of an existing through hole (not shown) in the head positioning arm 22 (the through hole being that provided for the fitting of a positioning means used in conjunction with prior art methods) as a reference. The method used by the inventor to accomplish this variation has been to direct a laser beam at the head positioning arm 22, a portion of which goes through the through hole. This portion of the laser beam is reflected by the surface of the media disk 14 (which has approximately a seventy percent reflectivity factor) by means of a polarized ref lector and onto the remote servo track positioning arm. Two photodiodes (not shown) are positioned on the remote servo track positioning arm at the edges of the reflected portion of the laser beam and a signal is created by each of the photodiodes as the reflected laser beam (having been rotated in polarity by a quarter wave plate and then passed back through the polarized ref lector) impinges upon the photodiode. These signals can be used to slave the head positioning arm 22 to the remote servo track positioning arm 48. While the inventor has found this non-preferred method of slaving the head positioning arm 22 to the remote servo track positioning arm 48 to be inferior in precision to the preferred embodiments 10 and 210 described herein, it does have the advantage that it requires absolutely no modification of existing disk drive assemblies 12.

One skilled in the art will also recognize that the inventive servo track writing apparatus 10, 210 may readily be adapted for use with a disk drive assembly 12 having multiple media disks 14 and/or with other variations and types of drive assemblies.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The servo track writing apparatus 10 and 210 are adapted to be widely used in the manufacture of hard magnetic disk drive devices. The predominant anticipated usages are for the writing of servo tracks 16 on drive units having media diameters of less than two inches.

Given the necessity for precise alignment of all components and tracks in modern high density disk drive assemblies, it has become industry practice to delay writing servo tracks until after the disk drive is nearly fully assembled. Among other advantages, this eliminates cumulative error that can be introduced by variance in the component parts of the disk drive. However, this also introduces the problem that there is little or no room to connect head position detection means and/or head position alteration means into the assembled drive. Once the servo track 16 is written onto the media disk 14, the disk drive assembly 12 can locate track positions in relation to the servo track 16. However, The servo tracks 16 must, themselves, be placed in relation to an external reference, and that purpose is served by the inventive servo track writing apparatus 10 and 210.

In use, the inventive servo track writing apparatus 10 and 210 operates much as prior art comparable devices, except that physical contact with the head positioning means in the disk drive assembly 12 is not necessary, since position of the read/write head 28 is determined in the noncontact method described herein, and the head positioning servo motor 68, which is a component of the disk drive assembly 12, is used to move the read/write head 28.

The servo track writing apparatus 10 and 210 of the present invention may be utilized in any application wherein conventional servo track positioning devices are used, and also in those applications wherein prior art means would not suffice, since they would not fit into the available space.

Since the servo track writing apparatus 10 and 210 of the present invention may be readily constructed and are physically significantly similar to prior art conventional servo track writing devices, and since they may be used in conjunction with existing laser interferometer units, it is expected that they will be acceptable in the industry as substitutes for the conventional servo track writing devices and as a means for writing servo tracks to newly developed small disk drive assemblies, as well as even smaller units yet to be developed. For these and other reasons, it is expected that the utility and industrial applicability of the invention will be both significant in scope and longlasting in duration.

I claim:

1. A servo track writing apparatus for positioning a read/write head and an associated head positioning arm over a media disk, comprising:
   a first movable arm;
   a laser interferometer for determining the position of said first movable arm;
   a head positioning arm affixed to the read/write head for holding and positioning the read/write head;
   a relationship determining apparatus for determining a the position of said head positioning arm relative to said first movable arm;
   first motive means for moving said first movable arm; and
   second motive means for moving the read/write head to maintain a fixed relationship between the read/write head and said first movable arm.

2. The servo track writing apparatus of claim 1, wherein:
   said relationship determining apparatus includes a light emitting means affixed to said first movable arm for projecting a light beam onto the head positioning arm, and a photosensitive diode array affixed to said first movable arm for sensing the location at which the light beam is reflected from the head positioning arm back onto said first movable arm.

3. The servo track writing apparatus of claim 1, wherein:
   the read/write head, the head positioning arm, and the media disk are components of a substantially assembled disk drive assembly.

4. The servo track writing apparatus of claim 1, wherein:
   the head positioning arm and the first movable arm are each pivotally mounted such that, as the first movable arm is pivoted, the head positioning arm may be kept parallel to the first movable arm by pivoting the head positioning arm.

5. The servo track writing apparatus of claim 1, wherein:
   the head positioning arm and the first movable arm each move linearly generally parallel to each other.

6. A head positioning apparatus for positioning a magnetic head in a disk drive assembly, the disk drive assembly having a head positioning arm affixed to the magnetic head for positioning the magnetic head over a rotating magnetic media, the head positioning apparatus comprising:
   a reference arm located external to the disk drive assembly, said reference arm being movable relative to the head positioning arm such that the head positioning arm may be moved to maintain a fixed relationship between the head positioning arm and the reference arm as the reference arm is moved;

a laser interferometer for determining the position of said reference arm; and a relationship determining means for determining the relationship of the head positioning arm to the reference arm.

7. The head positioning apparatus of claim 6, and further including:

a first motive means for moving said reference arm to a correct position for writing a servo track with the magnetic head, as determined by said laser interferometer; and a second motive means for moving the head positioning arm to maintain a fixed relationship with said reference arm as said reference arm is moved as determined by said relationship determining means.

8. The head positioning apparatus of claim 6, wherein:

said relationship determining means includes a light emitting device for emitting a light beam toward the head positioning arm and a light sensitive diode array positioned to receive the light beam after it is reflected from the head positioning arm.

9. The head positioning apparatus of claim 8, wherein:

the light emitting device is a diode laser.

10. The head positioning apparatus of claim 8, wherein:

the light emitting device and the head positioning arm are affixed to said reference arm such that the light beam strikes the diode array in a normal position when the head positioning arm is in a desired relationship to said reference arm and further such that the light beam strikes the diode array away from the normal position as the relationship of the head positioning arm deviates from its fixed relationship to said reference arm.

11. The head positioning apparatus of claim 6, wherein:

said laser interferometer includes a retroreflector affixed to said reference arm such that a measurement beam is directed into and reflected from the retroreflector for sensing movement of said reference arm.

12. The head positioning apparatus of claim 6, wherein:

said reference arm is pivotally mounted such that the head positioning arm can be pivoted to maintain a fixed relationship between said reference arm and the head positioning arm.

13. The head positioning apparatus of claim 6, wherein:

said reference arm moves linearly such that the head positioning arm can be moved in a linear manner generally parallel to said reference arm to maintain a fixed relationship between said reference arm and the head positioning arm.

14. The head positioning apparatus of claim 13, wherein:

said relationship determining means includes a convex mirror, a quarter wave plate, a polarized surface, a beam bending mirror, a light emitting device and a light sensitive diode array affixed to said reference arm such that a polarized light beam emitted from the light emitting device passes sequentially through the polarized surface, then through the quarter wave plate, then is reflected from the head positioning arm onto the convex mirror, and from the convex mirror is reflected back onto the head positioning arm and then again through the quarter wave plate and onto the polarized surface from which it is reflected onto the beam bending mirror and then onto the diode array.

15. A servo track writing device for positioning a head positioning arm with a read/write head affixed thereto such that the read/write head can write servo tracks onto a media disk in a disk drive assembly, comprising:

a reference arm which can be positioned relative to the disk drive assembly by a reference arm motive means; and a relationship determining means for determining any deviation from a fixed relationship between said reference arm and the head positioning arm such that the head positioning arm may be slaved according to information provided by said relationship determining means to maintain the fixed relationship between said reference arm and the head positioning arm.

16. The servo track writing device of claim 15, and further including:

a retroreflector affixed to said reference arm; and a laser interferometer for directing a reference beam into the retroreflector such that movement of said reference arm can be detected by the laser interferometer and information provided by the laser interferometer can be used to cause a reference arm motive means to move said reference arm as required.

17. The servo track writing device of claim 15, wherein:

the relationship determining means includes a light emitting means for directing a light beam onto the head positioning arm and a diode array for detecting where the light beam strikes the relationship determining means after the light beam is reflected from the head positioning arm; and the relationship determining means is affixed to and moves with said reference arm such that movement of the light beam on the diode array is indicative of a change in the relationship between the head positioning arm and said reference arm.

18. The servo track writing device of claim 15, wherein:

the head positioning arm of the disk drive is pivotally affixed to the disk drive and said reference arm is pivotally affixed external to the disk drive such that the head positioning arm can be maintained generally parallel to said reference arm as the reference arm is pivoted.

19. The servo track writing device of claim 15, wherein:

the head positioning arm moves linearly within the disk drive and said reference arm is mounted external to the disk drive such that said reference arm moves linearly generally parallel to the path of the head positioning arm.

* * * * *